A. HELFENSTEIN.
ELECTRIC FURNACE.
APPLICATION FILED JULY 21, 1910.
1,000,805.  Patented Aug. 15, 1911.
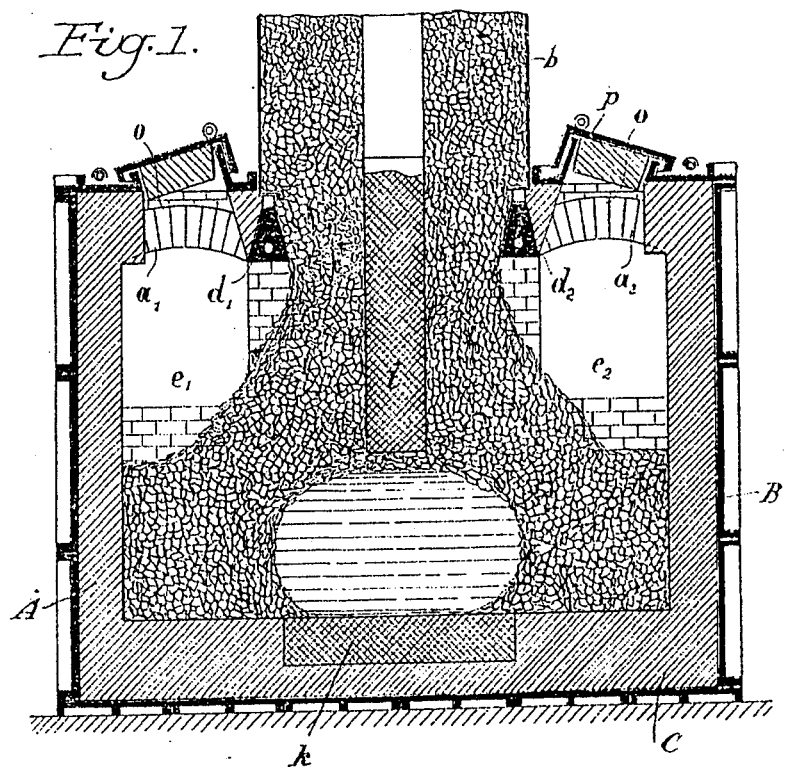
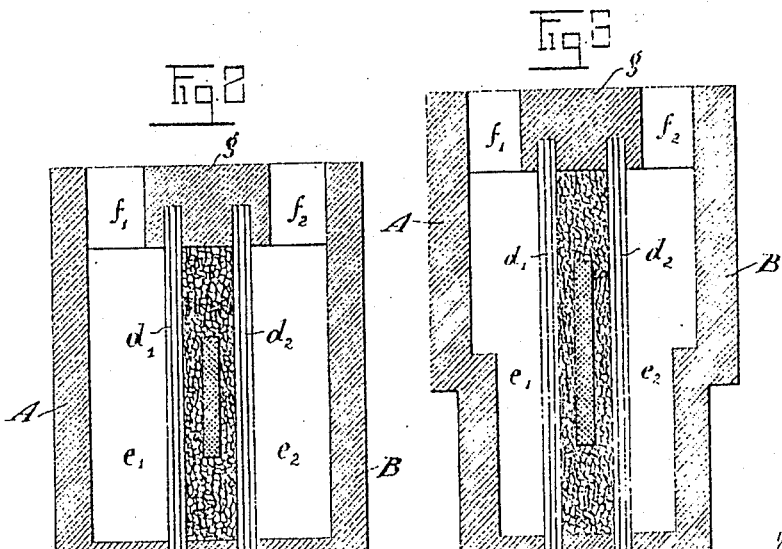

UNITED STATES PATENT OFFICE.

ALOIS HELFENSTEIN, OF VIENNA, AUSTRIA-HUNGARY.

ELECTRIC FURNACE.

1,000,805.      Specification of Letters Patent.      Patented Aug. 15, 1911.

Application filed July 21, 1910. Serial No. 573,123.

*To all whom it may concern:*

Be it known that I, ALOIS HELFENSTEIN, a citizen of the Republic of Switzerland, residing at 4 Porkornigasse, Vienna, Austria-Hungary, have invented certain new and useful Improvements in Electric Furnaces, of which the following is a specification.

The present invention relates to an electric furnace having a receptacle for the charge and a charge opening which extends the whole length of the furnace chamber.

A pair of girders or supports are arranged along the charge opening, and rest on the end walls of the furnace, which girders support the top of the furnace and the receptacle for the charge, the arrangement being such that when a full charge of the material to be reduced is in the furnace, two separate gas eliminating chambers are formed, each being provided with its special gas-discharge opening.

In view of the increase in the quality of gas produced during the operation of the furnace relatively to the direction of discharge of gas, and for insuring a uniform flow of the gas and preventing any obstruction in consequence of the sloping of the material, the gas eliminating chambers are enlarged in the direction of the gas discharge openings.

The invention is illustrated by way of example in the accompanying drawings, in which:

Figure 1 is a vertical transverse section of an electric furnace constructed in accordance with the principles of the present invention; Fig. 2 is a partial plan view of the same; and Fig. 3 is a plan view of an arrangement hereinafter referred to.

The improved electric furnace consists of the two side walls A and B and the bottom C, all of which may be constructed according to any preferred known method. The side walls A and B are connected by means of the end walls $g$ and $h$. On the top of the furnace two parallel supports $d'$ and $d^2$ are arranged, which are preferably in the form of girders which are cooled by means of water passages, said girders or supports resting on the end walls $g$ and $h$ of the furnace chamber. The girders $d'$ and $d^2$ are spaced apart so as to form a charge opening which extends the whole length of the furnace chamber, an extension of the furnace in the shape of a superposed receptacle $b$ for the purpose of confining the charge of material being arranged above, and supported on, the girders $d'$ and $d^2$. The lateral arched coverings of the furnace chamber $a'$ and $a^2$ are likewise supported by the said girders the latter, as before intimated, extending along the whole length of the furnace. An upper vertical electrode $i$, longitudinally arranged, is disposed in the charge opening between the girders $d'$ and $d^2$ and extends nearly the whole length of the furnace chamber; and horizontally arranged in the bottom C of the furnace, is the bottom electrode $k$, the same being horizontally disposed, and also preferably extending nearly the whole length of the furnace chamber. The openings $o$ for inspection and manipulation of the charge running toward the center and furnished with coverings $p$ are provided in the arched coverings $a'$ and $a^2$.

In consequence of the structure described, when a full charge of material is in the furnace, the same will extend the whole length of the furnace between the two girders or supports $d'$ and $d^2$, and as the charge of material slopes somewhat outwardly and toward the sides A and B of the furnace, separate chambers $e'$ and $e^2$ are formed, into which the reduction gases can escape. At one end of these spaces or chambers, gas-discharge passages $f'$ and $f^2$ are arranged, which afford special outlets for the gas for each gas eliminating chamber. As is shown in Fig. 3, the gas eliminating chambers are enlarged in the direction of gas discharge, that is, the furnace chamber is made wider at the gas-discharge end of the same than at the opposite end $h$.

I claim:—

1. Electric furnace comprising a suitable reduction chamber, a pair of girders extending from end to end of said chamber and arranged at the top thereof, said girders being spaced apart so as to form a charge opening for the reduction chamber extending the entire length of said chamber, a receptacle arranged above said girders and supported by the same to confine the charge, a vertical longitudinally disposed upper electrode arranged between the said girders said upper electrode extending nearly the whole length of the furnace chamber, and an electrode arranged in the bottom of the furnace.

2. Electric furnace comprising a suitable reduction chamber, a pair of girders extending from end to end of said chamber and arranged at the top thereof, said girders being spaced apart so as to form a charge opening for the reduction chamber extending the entire length of said chamber, a receptacle arranged above said girders and supported by the same to confine the charge, the arrangement being such that when a full charge of material is in the furnace two gas eliminating chambers are formed one to each side of said girders, a passage in an end wall of the furnace for each gas eliminating chamber for the escape of gas therefrom, a vertical longitudinally disposed upper electrode arranged between the said girders, said upper electrode extending nearly the whole length of the furnace chamber, and an electrode arranged in the bottom of the furnace.

3. Electric furnace comprising a suitable reduction chamber, a pair of girders extending from end to end of said chamber and arranged at the top thereof, said girders being spaced apart so as to form a charge opening for the reduction chamber extending the entire length of said chamber, a receptacle arranged above said girders and supported by the same to confine the charge, the arrangement being such that when a full charge of material is in the furnace two gas eliminating chambers are formed one to each side of said girders, a single vertical longitudinally disposed upper electrode arranged between the said girders which extends nearly the whole length of the furnace chamber, and an electrode arranged in the bottom of the furnace.

4. Electric furnace comprising a suitable reduction chamber, a pair of girders extending from end to end of said chamber and arranged at the top thereof, said girders being spaced apart so as to form a charge opening for the reduction chamber extending the entire length of said chamber, a receptacle arranged above said girders and supported by the same to confine the charge, the arrangement being such that when a full charge of material is in the furnace two gas eliminating chambers are formed one to each side of said girders, passages in the end wall of the furnace one for each gas eliminating chamber for the escape of gas therefrom, said reduction chamber being wider in cross-section at the gas-discharge end than at the opposite end, a single vertical longitudinally disposed upper electrode arranged between the said girders said upper electrode extending nearly the whole length of the furnace chamber, and an electrode arranged in the bottom of the furnace.

5. Electric furnace comprising vertical side walls, a bottom wall with an electrode arranged therein, end walls, a pair of supports resting on said end walls extending from end to end of the furnace and arranged at the top thereof, said supports being spaced apart so as to form a charge opening for the furnace extending the entire length thereof, a receptacle arranged above said supports and having two confining walls carried by said supports for the purpose of holding a charge before it is fed into the furnace, and a vertical longitudinally disposed upper electrode arranged between said pair of supports, said electrode extending nearly the whole length of the furnace chamber.

6. Electric furnace comprising vertical side walls, a bottom wall with an electrode arranged therein, end walls, a pair of supports resting on said end walls extending from end to end of the furnace and arranged at the top thereof, said supports being spaced apart so as to form a charge opening for the furnace extending the entire length thereof, a receptacle arranged above said pair of supports having two confining walls carried by said supports for the purpose of holding a charge before it is fed into the furnace, a single vertical longitudinally disposed upper electrode arranged between said pair of supports said upper electrode extending nearly the whole length of the furnace chamber, the arrangement being such that when a full charge of material is in the furnace two separate gas eliminating chambers are formed one to each side of said supports and upper electrode, and two passages arranged in one end wall of the furnace for the escape of gas therefrom one for each gas eliminating chamber, substantially as described.

7. Electric furnace comprising vertical side walls, a bottom wall with an electrode arranged therein, end walls, a pair of girders resting on said end walls extending from end to end of the furnace and arranged at the top thereof, said girders being spaced apart so as to form a charge opening for the furnace extending the entire length thereof, a receptacle arranged above said girders having two confining walls carried by said girders for the purpose of holding a charge before it is fed into the furnace, top walls for said furnace also supported by said girders, and a single vertical longitudinally disposed upper electrode arranged between said girders, said upper electrode extending nearly the whole length of the furnace chamber.

8. Electric furnace comprising vertical side walls, a bottom wall with an electrode arranged therein, end walls, a pair of girders resting on said end walls extending from end to end of the furnace and arranged at the top thereof, said girders being spaced apart so as to form a charge opening for the furnace extending the entire length thereof, top walls for said furnace also supported by said girders, a receptacle arranged above said girders and having two confining walls carried by said girders for the purpose of holding a charge before it is fed into the furnace, a single vertical longitudinally disposed upper electrode arranged between the said girders said upper electrode extending nearly the whole length of the furnace chamber, the arrangement being such that when a full charge of material is in the furnace two separate gas eliminating chambers are formed one to each side of said girders and upper electrode, and two passages arranged in one end wall of the furnace for the escape of gas therefrom one for each gas eliminating chamber, said reduction chamber being wider in cross-section at the gas-discharge end than at the opposite end.

In testimony whereof I affix my signature in presence of two witnesses.

ALOIS HELFENSTEIN.

Witnesses:
IGNAZ KNORFELMACHT,
AUGUST FUGGER.

Copies of this patent may be obtained for five cents each, by addressing the "Commissioner of Patents, Washington, D. C."